June 21, 1932. W. WITTER 1,864,161
SEPARATING AND RECOVERING NONFERROUS METALS
FROM METALLIC INITIAL MATERIALS
Filed Dec. 5, 1930

Inventor
Wilhelm Witter
By Maurice Bloch
Attorney

Patented June 21, 1932

1,864,161

UNITED STATES PATENT OFFICE

WILHELM WITTER, OF HALLE, GERMANY, ASSIGNOR TO THE FIRMA M. LISSAUER & CIE., OF COLOGNE-ON-THE-RHINE, GERMANY

SEPARATING AND RECOVERING NONFERROUS METALS FROM METALLIC INITIAL MATERIALS

Application filed December 5, 1930, Serial No. 500,166, and in Germany December 19, 1929.

This invention relates to a process of and apparatus for separating and recovering volatile metals, such as zinc, tin, antimony, lead, arsenic or bismuth from metallic materials containing copper and/or nickel.

Hitherto it has only been possible to treat such metallic materials in a cumbersome manner and in a large number of operations and it has been impossible to separate the individual constituents quantitatively if at all.

Materials such as red brass, tombak and the like alloys containing about 60–90% of copper, 2–12% of tin and 1–10% of lead, remainder zinc or also stanniferous brass or German silver have up to the present been worked up into copper or copper nickel by treating the material in a converter, by which means the zinc and tin are volatilized. In this manner there were obtained a crude copper containing up to 98% of copper and an oxidic mixture having a tin content amounting to between 10–30% depending on the tin content of the initial material. These oxides are termed "mixed oxides" and are brought on the market as such. These mixed oxides are usually further worked up by melting the material mixed with sodium carbonate and anthracite in a reverberatory furnace. As soon as the mass in the furnace reaches the volatilization temperature of the zinc, that is to say about 1000° C. the zinc passes off as vapour, burns in the flue to zinc oxide and is collected in a bag filter plant. It is however impossible to avoid the zinc vapours carrying away with them a part of the original charge. Moreover certain amounts of tin are burnt together with the combustion gases. The zinc oxide obtained in this manner still contains considerable amounts of tin, for example, 3–6% of tin and about 5–8% of lead besides 60–65% of zinc.

This method of operation is thus very cumbersome and entails substantial losses of tin.

Moreover alloys freed from zinc or initially free from zinc could hitherto be worked up only in a very complicated manner. When blowing bell bronzes in converters, for example, it was possible in one operation to recover about only 50–60% of the tin content in the form of $SnO_2$. In order to recover the residual tin, several auxiliary processes had to be repeated several times in order finally to recover about 85% of the tin content. This process with its extremely cumbersome auxiliary operations has hitherto not been superseded by any other metallurgical process.

The present invention enables the volatile metals to be separated from such initial materials, especially from copper and/or nickel alloys in one operation up to the minutest amounts and to recover them practically completely. This is attained so to speak in contradistinction to the well-known converter process by forcing reducing gases such as for example, hydrogen, carbon monoxide, producer gas, water gas, illuminating gas, coke oven gas and the like through the metal bath, heated to the requisite temperature, whereupon according to the properties of the initial material, an inert or oxidizing atmosphere is maintained above the bath by suitably regulating the combustion. The additional constituents are recoverd in all cases in the oxidic form. This method of operation at the same time enables the additional constituents to be removed and recoverd separately.

The sequence in which the individual additional constituents should be removed depends in each case upon the composition of the initial materials.

If the initial material contains, for example, both zinc and tin, then according to a modification of the invention in order to separate these metals, the furnace atmosphere must be maintained inert or even slightly reducing until the zinc has been removed. The gas forced into the bath displaces the zinc which is in the labile state so to speak, or the zinc vapour from the metal bath. The zinc vapours displaced from the bath burn in the flue to zinc oxide which is free from tin or very poor in tin. Since the introduced gas does not react with the zinc in this process, it is possible not only to use reducing gases but also gases which are inert towards zinc.

When all the zinc has been removed from the bath, or when a material initially free from zinc is treated, then measures must be taken to provide an oxidizing atmosphere for the removal of the tin and the remaining volatile metals. By continuing then the introduction of reducing gases the tin alloyed with the copper becomes oxidized on the surface of the bath and volatilized. Any copper oxidized at the same time and small amounts of tin combined with the copper are again reduced to metal by the action of the reducing gases.

The process may be continued until all the tin has been removed from the bath. For this purpose reducing gases only are suitable. In a similar way it is also possible, by carrying out the process, in a suitable manner, to remove other constituents, such as for example, antimony.

It has already been proposed, on the basis of a known principle, to separate out alkali metals from their alloys with lead by introducing nitrogen into the fluid alloy. Whereas this known process was carried out in closed iron vessels externally heated and the vapours driven off were condensed in a metallic state, according to the present invention, however, the process is carried out in such a manner with the employment of internal heating that the metal vapours are burnt to oxides.

The removal of the tin and any other volatile metals can be substantially accelerated and improved by adding definite amounts of sulphur or sulphur-yielding substances in a solid, fused, vapourous or gaseous form to the metal bath before or during the treatment with reducing gases. In the case of cupriferous alloys it is advantageous to employ copper pyrites or copper matte, although other sulphur-yielding products may also be employed.

An advantageous method of carrying out the present process consists in melting the initial material in a suitably heated tiltable furnace for example, a drum furnace. From this furnace, which may simultaneously serve as a storage container for the fluid raw material, a portion is from time to time transferred to a second furnace in which the gas treatment takes place (reaction furnace). This reaction furnace may be heated in any desired manner but it must be so constructed that the temperature necessary for the course of the process (which lies between 900 and 1400° C. depending on the composition of the initial material) is maintained throughout the process. In order to avoid excessive cooling of the metal bath, the reaction gas employed is preferably preheated. It is accordingly preferable to employ as reaction gases, such gases which can be preheated to about 800° C.

In order more clearly to understand the invention, reference is made to the accompanying drawing, which illustrates by way of example two embodiments of furnace suitable for carrying out the process and in which.

Figure 1:
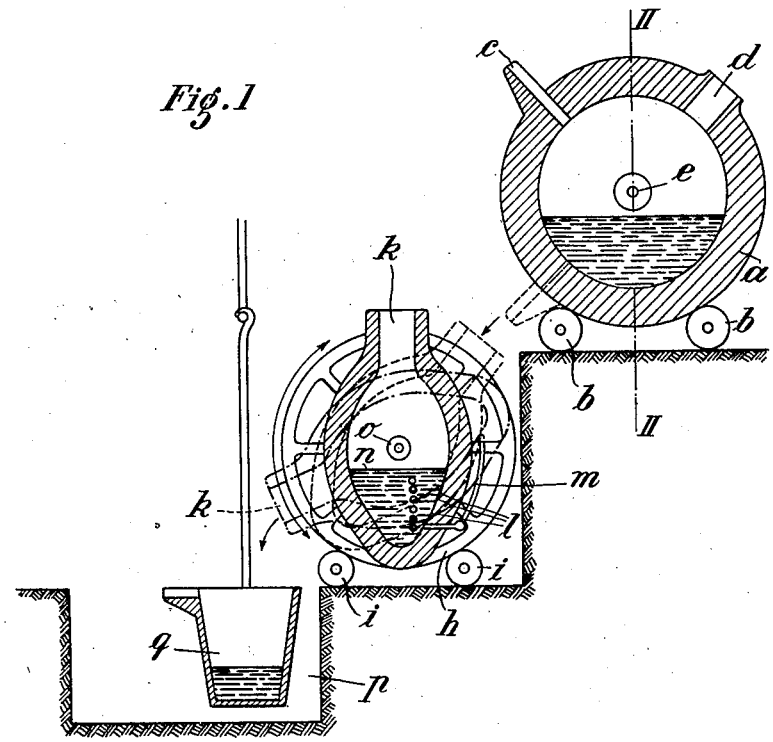
Fig. 1 is a cross section through the entire plant.
Figure 2:
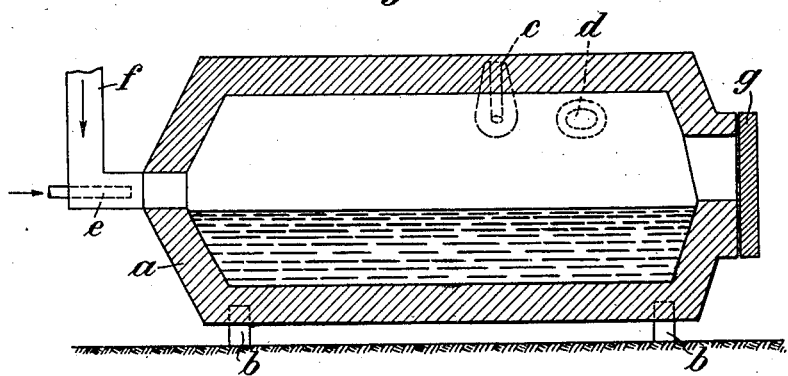
Fig. 2 is a longitudinal section through the melting furnace along lines II—II of Fig. 1.

The melting furnace $a$, an ordinary drum furnace, is rotatably mounted on rollers $b$. It is provided with a pouring spout $c$ and with an outlet opening $d$ for the heating gases. At one end is arranged a burner $e$ to which air is led through a channel $f$. A charging door $g$ is provided at the opposite end.

Below the melting furnace $a$ is arranged the reaction furnace $h$. This furnace is also rotatably mounted on rollers $i$, and is provided with an opening $k$ through which it is filled and emptied and through which the gases escape during the blowing operation. The gases are introduced through twyers $l$ communicating with a conduit $m$. The gas issues through the twyers $l$ into the metal bath $n$ and escapes through the opening $k$. The metal bath is heated in the reaction furnace in any suitable manner, and in the embodiment illustrated by a burner $o$. Beneath the reaction furnace is arranged a pit $p$ in which a conveyor, for example, a ladle $q$ can be introduced.

The plant is operated as follows:

The furnace $a$ is charged through the door $g$, after which the contents of the furnace are heated by the burner $e$. The heating gases escape through the opening $d$. From time to time the furnace is rotated into the position indicated in dotted lines so that a portion of its contents flow into the reaction furnace, which is likewise rotated into the position indicated by dotted lines. Both furnaces are thereupon rotated and returned into the position indicated in full lines. The gas treatment thereupon takes place in the reaction furnace.

As soon as the refining process has been completed the reaction furnace is rotated around its axis into the position indicated in chain dot lines so that a part or the whole of the furnace contents flows from the opening $k$ into the ladle $q$. The furnace is thereupon filled again. The working temperatures lie between 900 to 1400° C. and depend on the nature and composition of the material to be treated.

The hereinbefore described process was applied to the treatment of alloys containing 80% of copper, 3 to 7% of tin, 2 to 3% of lead, remainder zinc, in charges of 1250 kg. Illuminating gas was introduced into the metal bath having a temperature of 1200 to 1300° C. and an oxidizing furnace atmosphere was maintained. An oxide was recovered which had the following composition: 49–50% of zinc, 19.0–19.5% of tin; 9.5–10% of lead. The metal bath contained only traces of zinc, 0.1–0.15% of lead and 0.1–0.2% of tin.

In a second series of experiments, about 1000 kg. of the same alloy were fused and then introduced into the hereinbefore described reaction furnace $h$, after which illuminating gas under a pressure of 0.7 atm. was forced into the hot metal bath at a temperature of about 1250° C. The supply of gas was so controlled that about 100 cubic metres passed through the metal bath per hour. At the same time the oil and air supplied to the oil burner of the reaction furnace were so regulated that the flame leaving the furnace gave a feeble illumination. Zinc immediately volatilized and the progress of the volatilization could be followed accurately by the amount of zinc oxide fumes developed at the edge of the flame. As soon as the evolution of zinc slackened off—indicating the end of the reaction—a sample was taken from the metal bath. This sample contained:

| | Per cent |
|---|---|
| Cu | 92 |
| Sn | 6 |
| Pb | 1.5 |
| Zn | 0.12 |

The oxide, which was trapped in a filter, had the following composition:

| | Per cent |
|---|---|
| Zn | 70 to 71 |
| Sn | 0.2 to 0.3 |
| Pb | 7.8 |

Up to this time 1½ hours had elapsed. After the zinc had been removed, the reaction furnace was stopped, 15 kg. of copper pyrites was added to the metal bath and melted therein within 10 minutes. The reaction furnace was then again brought into operation and illuminating gas under the same pressure was again forced into the metal bath, and at a rate of 80 cubic metres per hour, at the same time however, the oil and air supplied to the oil burner was so regulated that a short flame appeared (no longer yellow but bluish) with a highly oxidizing action. Almost immediately a vigorous evolution of tin oxide took place, the progress of which could be followed by the intensity of the fume formation in the same way as in the case of the zinc. After the evolution of fumes had slackened off, the samples were continually taken from the metal bath and by means of these samples the moment was established at which practically all the tin had been removed from the bath. From the moment of the zinc removal up to the moment of the tin removal, 90 minutes elapsed. The metal freed from zinc, tin and lead had the following composition:

| | Per cent |
|---|---|
| Cu | 98.25 |
| Sn | 0.11 |
| Pb | 0.14 | whilst the oxide trapped in the filter had the following composition:

| | Per cent |
|---|---|
| Sn | 56.12 |
| Pb | 14.28 |
| Sb | 1.02 |
| Zn | 5.14 |
| Cu | 0.32 |

Moreover 600 kg. of a bronze containing 7% of tin, 85.75% of copper, 5.06% of lead, 0.91% of antimony and 0.05% of zinc were treated in the hereindescribed manner with reducing gases with the addition of 12 kg. of copper pyrites. The residual metal contained:

97.85% of copper, 0.23% of tin, 0.12% of lead and 0.21% of antimony.

The removed constituents were recovered as an oxidic mixture having the following composition:

39.0% of tin, 32.6% of lead, 0.10% of copper and 0.12% of antimony.

In this experiment only 30 kg. of slag having a total metal content of approximately 50% were obtained so that only 15 kg. or 2.5% of the previous metal charge had to be retreated.

The fractional separation of tin and antimony is illustrated by the following example:

700 kg. of an alloy containing 15.36% of tin, 61.02% of copper, 3.57% of lead and 11.04% of antimony were subjected to the hereindescribed treatment with the addition of 60 kg. of copper pyrites. After the removal of the tin the metal bath had the following composition:

1.02% of tin, 82.04% of copper, 0.83% of lead and 10.26% of antimony and the oxide obtained in this operation contained:

48.63% of tin together with 3.60% of antimony.

The antimony was removed from the metal bath by further treatment with gas and a copper was obtained which contained:

0.20% of tin, 1.38% of antimony and 96.7% of copper.

The process of the present invention can also be applied to the treatment of metallic intermediate products from metallurgical works which contain in addition to copper and/or nickel small amounts only of valuable metals such as tin, bismuth or the like.

During this treatment of the material, for example, stanniferous crude copper, the metals detrimental to the utilization of the copper are removed directly from the bath without fresh complex intermediate products being formed.

From the large number of experiments carried out, the remarkable fact arises that the amount of slag obtained in the herein-described process is extraordinarily small, thus substantially increasing the economic importance of the process. When taking into consideration the fact that when blowing the initial materials set forth in the example in the hitherto usual manner in the converter, 40% or even more of slag is obtained and that this slag must be returned to the operation for the recovery of its metal content, the importance of a considerable reduction of this amount of slag in the economy of the process can be seen.

What I claim is:—

1. A process for separating and recovering volatile metals such as zinc, tin, antimony, lead, arsenic and bismuth, from metallic initial material containing non-volatile metals such as copper and nickel, which comprises melting said metallic initial material, passing reducing gas through said molten material, and regulating the combustion at the surface of said molten material so as to maintain at said surface an atmosphere which can vary from a slightly reducing to an oxidizing character.

2. A process for separating and recovering volatile metals such as zinc, tin, antimony, lead, arsenic and bismuth, from metallic initial material containing non-volatile metals such as copper and nickel, which comprises melting said metallic initial material, passing reducing gas through said molten material, and regulating the combustion at the surface of said molten material so as to maintain an oxidizing atmosphere at said surface.

3. A process for separating and recovering zinc and other volatile metals such as tin, antimony, lead, arsenic and bismuth, from metallic initial material containing non-volatile metals such as copper and nickel, which comprises melting said metallic initial material, passing reducing gas through said molten material, regulating the combustion at the surface of said molten material so as to maintain at said surface a slightly reducing atmosphere until the zinc has been driven off and thereupon regulating said combustion so as to maintain an oxidizing atmosphere at the surface of said material.

4. A process for separating and recovering volatile metals such as zinc, tin, antimony, lead, arsenic and bismuth, from metallic initial material containing non-volatile metals such as copper and nickel, which comprises melting said metallic initial material, adding sulphur-yielding substances thereto, passing reducing gas through said molten material and regulating the combustion at the surface of said molten material so as to maintain an oxidizing atmosphere at said surface.

5. A process for separating and recovering zinc, and other volatile metals such as tin, antimony, lead, arsenic and bismuth, from metallic initial material containing non-volatile metals such as copper and nickel, which comprises melting said metallic initial material, passing reducing gas through said molten material, regulating the combustion at the surface of said molten material so as to maintain at said surface a slightly reducing atmosphere until the zinc has been driven off, thereupon adding sulphur-yielding substances to said molten material and regulating said combustion so as to maintain an oxidizing atmosphere at the surface of said material.

6. A process for separating and recovering volatile metals such as zinc, tin, antimony, lead, arsenic and bismuth, from metallic initial material containing non-volatile metals such as copper and nickel, which comprises melting said metallic initial material, passing preheated reducing gas through said molten material, and regulating the combustion at the surface of said molten material so as to maintain at said surface an atmosphere which can vary from a slightly reducing to an oxidizing character.

7. A process for separating and recovering zinc and other volatile metals such as tin, antimony, lead, arsenic and bismuth, from metallic initial material containing non-volatile metals such as copper and nickel, which comprises melting said metallic initial material, passing preheated reducing gas through said molten material, regulating the combustion at the surface of said molten material so as to maintain at said surface a slightly reducing atmosphere until the zinc has been driven off and thereupon regulating said combustion so as to maintain an oxdizing atmosphere at the surface of said material.

8. A process for separating and recovering zinc, and other volatile metals such as tin, antimony, lead, arsenic and bismuth, from metallic initial material containing non-volatile metals such as copper and nickel, which comprises melting said metallic initial material, passing preheated reducing gas through said molten material, regulating the combustion at the surface of said molten material so as to maintain at said surface a slightly reducing atmosphere until the zinc has been driven off, thereupon adding sulphur-yielding substances to said molten material, and regulating said combustion so as to maintain an oxdizing atmosphere at the surface of said material.

In witness whereof I have hereunto set my hand.

WILHELM WITTER.